Figure 1:
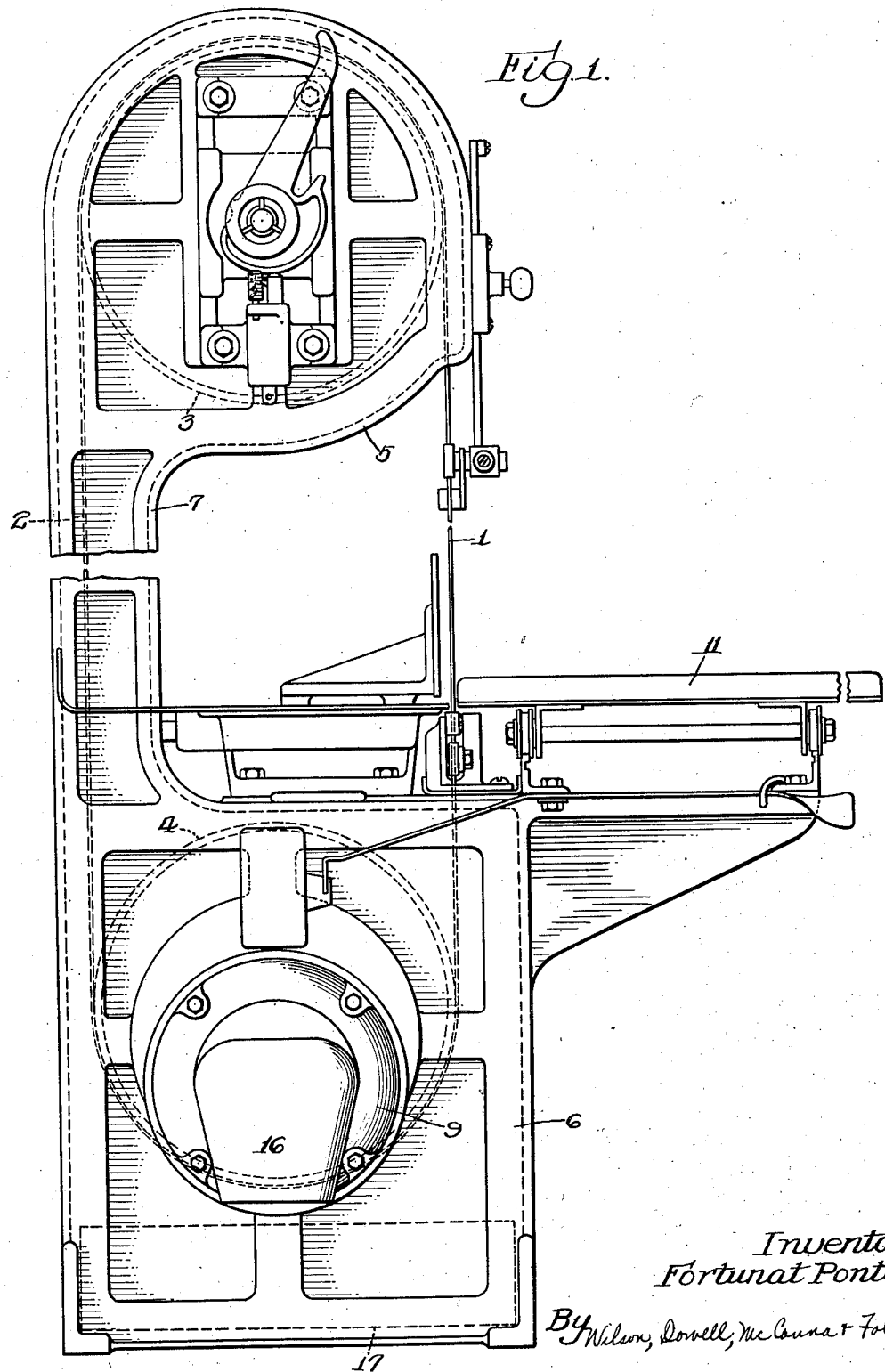

July 9, 1935.  F. PONTON  2,007,458

MEAT AND BONE CUTTING MACHINE

Original Filed Jan. 30, 1933   2 Sheets-Sheet 1

Inventor:—
Fortunat Ponton,
By Wilson, Dowell, McCanna & Foley
Attys

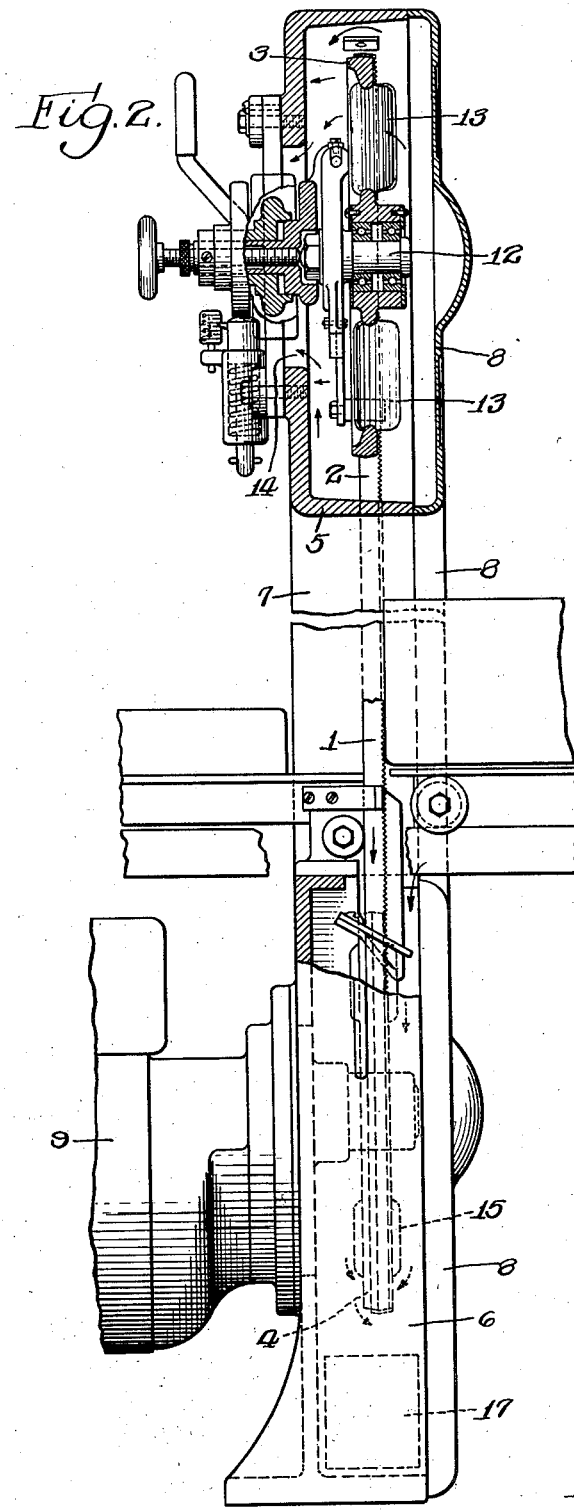

Patented July 9, 1935

2,007,458

UNITED STATES PATENT OFFICE 2,007,458

MEAT AND BONE CUTTING MACHINE

Fortunat Ponton, Chicago, Ill., assignor to Vaughan Company, Chicago, Ill., a corporation of Illinois Original application January 30, 1933, Serial No. 654,149, now Patent No. 1,967,724. Divided and this application July 23, 1934, Serial No. 736,475

2 Claims. (Cl. 143—157)

This invention relates to meat and bone cutting machines adapted for butchers' and meat dealers' use. This application is a division of my copending application Serial No. 654,149, filed January 30, 1933 now Patent No. 1,967,724, issued July 24, 1934.

One of the objects of this invention is the provision in a band saw meat and bone cutting machine of means for preventing the sawdust, meat and bone particles, etc., from adhering to the operating parts of the machine and for directing substantially all of it to one location from which it may readily be removed.

The foregoing object is attained by an air-circulating system within the casing of the machine, which keeps sawdust and other solid particles away from the mechanism and directs the particles by the flow of air to one collecting point from which they may from time to time be removed.

In the drawings:

Fig. 1 represents a rear elevation of a machine constructed in accordance with this invention, and Fig. 2 is a side elevation of the same machine with parts thereof shown in section.

Referring now to the drawings, the machine shown employs a continuous band saw, the forward portion or stretch 1 of which is exposed for cutting and the remaining portion including the stretch 2 being concealed within the casing or protected by the upper saw guide and guide bar.

An upper wheel 3 and a lower wheel 4 support the band saw. The means for adjusting the tension of the band by moving the upper wheel is fully described in the above mentioned application.

The two wheels are mounted in a frame having an upper section 5, a lower section 6, and an intermediate connecting section 7. A single door 8 hinged along one vertical edge thereof serves to close the entire upper, lower, and intermediate sections.

Secured to the frame in any suitable manner is a driving motor 9 for propelling the lower wheel and thereby driving the band saw.

A movable work table 11 is provided for supporting the meat that this band saw is intended to cut. The construction of the table and its associated parts is described in the above mentioned application.

The upper wheel is journaled on a stud 12 which is carried upon the tension adjustment means, as is more fully described in the aforesaid application. Within the rim of the upper wheel a plurality of fan blades 13 are mounted and arranged to expel air through the opening 14 provided in the upper frame member surrounding the support for the upper wheel.

The lower wheel 4 in the lower compartment of the casing is provided with similar fan blades 15 which, however, are set at an inclination to deliver air against the inner face of the door 8 or, in other words, toward the right viewing Fig. 2. The air is drawn into the lower chamber of the housing through an opening in the top of this chamber below the lower saw guide and around the saw blade, and the sawdust and meat and bone particles, which, if undisturbed, would have a tendency to cling to the blade and adhere to the perimeter of the wheel 4, are, by the air circulation set up in this lower chamber by the fan blades, blown away from the saw blade and the wheel against the inner face of the door from which they may drop into the receptacle 17 at the bottom of the chamber.

The air entering this lower chamber of the housing is discharged upwardly through the intermediate section 7 of the housing into the upper chamber from whence it is discharged to atmosphere through the openings 14 by the fan blades 13, as previously explained. Such particles of solid matter as may be carried into the upper chamber by the air flow upwardly from the lower chamber are, by the centrifugal action of the fan blades 13, thrown against the walls of the upper chamber and settle upon the lower wall thereof from which they may be removed when the door is opened.

It will be apparent from the foregoing that the employment of the fan blades in the two chambers of the housing cools and dries the meat particles and serves to prevent the lodging of solid particles upon the operating parts of the machine, the bulk of the solid matter being disposed of in the lower chamber to which it is brought by the saw, and in this chamber the particles after being thrown against the front wall drop into the receptacle 17, or if some of them adhere to the inner face of the door they may be readily scraped off when the door is opened. The circulation in the lower chamber is assisted by the fan blades in the upper chamber which contribute toward an upward circulation of air from the lower to the upper chamber, and any solid particles in the upper chamber are thrown away from the operating parts of the machine and deposited upon the walls from which they may be readily removed.

The structural details are obviously capable of wide variation without departing from the essence of the invention as defined in the following claims.

I claim:

1. A meat and bone cutting machine comprising an endless saw blade trained over upper and lower wheels, a housing providing chambers enclosing said wheels and one stretch of said blade, the lower wheel being provided with fan blades for establishing an air circulation in the lower chamber, the chamber surrounding the upper wheel having an air outlet, the upper wheel being provided with fan blades arranged to draw air from the lower chamber and discharge it through said outlet.

2. A meat and bone cutting machine comprising upper and lower band saw wheel and a band saw blade trained over them, a housing providing chambers enclosing both said wheels and one stretch of said blade, the entire housing having a vertical opening on one side, a door for closing said vertical opening, each wheel being provided with fan blades, the upper chamber having an air outlet and the fan blades therein being arranged to draw air from the lower chamber through the connecting chamber and discharge it through said outlet, the fan blades on the lower wheel being arranged to blow air against said door as well as upwardly through said connecting chamber.

FORTUNAT PONTON.